US006094677A

United States Patent [19]
Capek et al.

[11] Patent Number: 6,094,677
[45] Date of Patent: Jul. 25, 2000

[54] METHODS, SYSTEMS AND COMPUTER PROGRAM PRODUCTS FOR PROVIDING INSERTIONS DURING DELAYS IN INTERACTIVE SYSTEMS

[75] Inventors: Peter G. Capek, Ossining, N.Y.; Gennaro A. Cuomo, Apex, N.C.; Jay H. Unger, Darnestown, Md.

[73] Assignee: International Business Machines Corporation, Armonk, N.Y.

[21] Appl. No.: 08/866,658

[22] Filed: May 30, 1997

[51] Int. Cl.[7] .................................................. G06F 15/16
[52] U.S. Cl. .............................................. 709/219; 705/14
[58] Field of Search .................................. 709/206, 217, 709/218, 219, 229, 232; 707/10, 104, 200, 507; 705/14

[56] References Cited

U.S. PATENT DOCUMENTS

| | | | |
|---|---|---|---|
| 4,879,849 | 11/1989 | Hollingsworth, III et al. | 52/10 |
| 4,895,376 | 1/1990 | Shiung-Fei | 273/313 |
| 5,083,271 | 1/1992 | Thacher et al. | 364/411 |
| 5,333,272 | 7/1994 | Capek et al. | 345/340 |
| 5,498,003 | 3/1996 | Gechter | 273/434 |
| 5,522,018 | 5/1996 | Takeda et al. | 395/122 |
| 5,555,354 | 9/1996 | Strasnick et al. | 395/127 |
| 5,608,850 | 3/1997 | Robertson | 345/427 |
| 5,633,993 | 5/1997 | Redmann et al. | 395/119 |
| 5,662,526 | 9/1997 | Yasumaru et al. | 463/30 |
| 5,680,524 | 10/1997 | Maples et al. | 395/127 |
| 5,702,307 | 12/1997 | Moran | 472/47 |
| 5,734,805 | 3/1998 | Isensee et al. | 395/119 |
| 5,736,982 | 4/1998 | Suzuki et al. | 345/330 |
| 5,737,619 | 4/1998 | Judson | 709/218 |
| 5,764,912 | 6/1998 | Rosborough | 709/224 |
| 5,850,225 | 12/1998 | Cosman | 345/427 |
| 5,854,897 | 12/1998 | Radziewicz et al. | 709/224 |
| 5,862,337 | 1/1999 | Gray | 709/224 |
| 5,919,045 | 7/1999 | Tagge et al. | 434/62 |
| 5,978,841 | 11/1999 | Berger | 709/217 |

OTHER PUBLICATIONS

Kohda et al. "Ubiquitous advertising on the WWW: Merging advertisement on the browser", Computer Networks and ISDN Sysetms 28 (1996) pp. 1493–1499.

Cheong, Fah–Chun, World Wide Web: Playground for Robots, Web Proxies, *Internet Agent: Spiders, Wanderers, Brokers, and Bots*, Ch. 3, p. 67 (New Riders 1996).

http://www.news.com.SpecialFeatrues/Continued/0,6,4804 4,00.html, "Billboards on the Infobahn," pp. 1–2.

*Primary Examiner*—Dung C. Dinh
*Attorney, Agent, or Firm*—Myers Bigel Sibley & Sajovec; Jeanine S. Ray-Yarletts

[57] ABSTRACT

Methods, systems and computer program products are provided for providing information in the form of an insertion to a user during delays in retrieving program material with an interactive system. This may include making a determination of whether the delay is going to be sufficiently long to provide the user with an insertion. In addition, the insertion may be customized to either the user or to the program material requested, or to both the user and the requested program material. The insertion may include control logic that provides the user with control over the insertion and/or the interactive system.

38 Claims, 7 Drawing Sheets

METHODS, SYSTEMS AND COMPUTER PROGRAM PRODUCTS FOR PROVIDING INSERTIONS DURING DELAYS IN INTERACTIVE SYSTEMS

RELATED APPLICATION

The present application is related to U.S. patent application Ser. No. 08/866,826 (pending), entitled "Methods, Systems and Computer Program Products for Navigating and Advertising in Three Dimensional Virtual Reality Worlds Using Transportation Vehicles", co-filed with the present application on May 30, 1997, and commonly assigned.

FIELD OF THE INVENTION

The present invention generally relates to networked computer systems, and more particularly, to networked computer systems for interactively providing information to a user.

BACKGROUND OF THE INVENTION

The communications industry has seen a rapid growth in networked computer systems with an interactive user interface. One example of such an interactive system is the World Wide Web. However, for a variety of reasons, interactive systems may suffer from response delays which are delays from the time information is requested until the information is displayed to a user. Response delays are typically associated with a user making a request for information and then experiencing a delay while waiting for the information to be retrieved from a remote source, decoded and presented. An example of a system in which response delays are fairly common is the World Wide Web (WWW), as discussed below.

Figure 1:
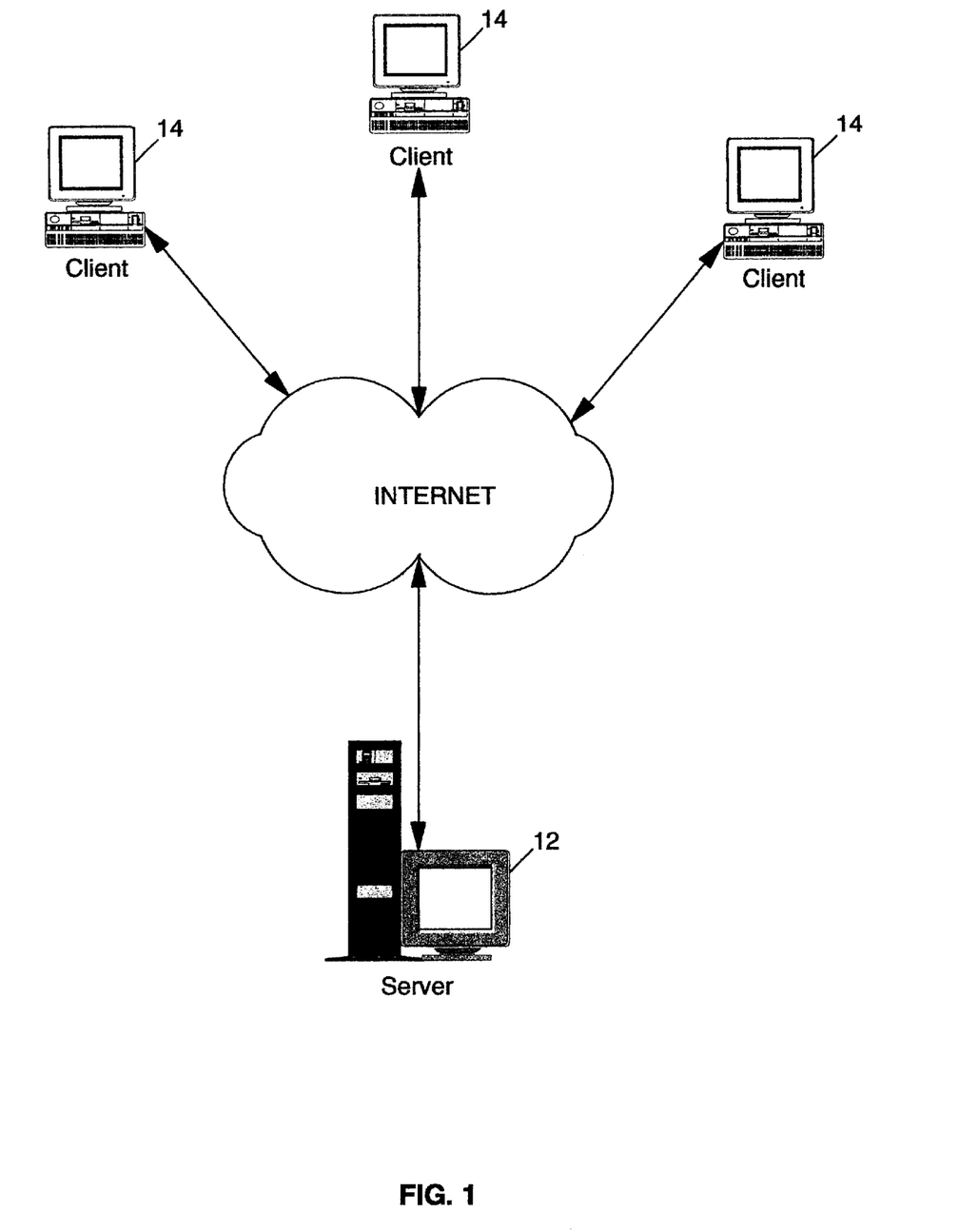
FIG. 1 is a schematic diagram illustrating an example of the interconnections comprising the World Wide Web (WWW) facility of the Internet.

The WWW, which is one of several service facilities provided on top of the Internet, is a hypermedia facility that allows users to browse web pages through a graphical user interface (GUI) called a web browser. The WWW is a client-server based network that comprises a number of servers 12 (e.g., computers connected to the Internet) on which web pages or files reside and a number of clients 14 (e.g. web browsers) which interface the users with the web pages. A web browser is a software application such as WebExplorer® (IBM Corporation) or Netscape Navigator® (Netscape Communication Corporation) that operates on a client 14 and that typically sends a request over the Internet to a server 12 requesting a copy of a web page identified by a uniform resource locator (URL). The URL describes both the server 12 where the web page resides and the information that is being requested. In response, the server 12 sends a copy of the requested information to the web browser which displays the web page to the user.

Web pages on the WWW may be hyper-media documents written in a standardized language called hypertext markup language (HTML). A typical web page includes text together with embedded formatting commands, referred to as tags, which can be used to control the font size, the font style (for example, whether italic or bold), the layout of the text or other document attributes. A web browser parses the HTML in order to display the text in accordance with the specified format. In addition, a web page can also contain a reference, in terms of another URL, to a piece of multimedia data, for example, an image, a video segment, or an audio file. The web browser responds to such a reference by retrieving and displaying or playing the data. This often requires the web browser to launch another software application such as a plug-in or helper program that is particularly configured for displaying or playing the multimedia data as formatted. For example, RealAudio™ Player (Progressive Networks) is a plug-in application that allows a user to download and play streaming audio in real-time over the WWW using streaming media technology. Alternatively, such multimedia data may form its own web page, without any surrounding HTML text.

Some web pages also contain one or more references to other web pages which need not be on the same server as the original web page. Such references may generally be activated by the user selecting a particular location on the screen, typically by clicking a primary button of a pointing device such as a mouse. These references or locations are known as hyperlinks, and are typically flagged by the browser in a particular manner (for example, any text associated with a hyperlink may be in a different color or underlined). If the user selects the hyperlink, then the referenced page is retrieved and replaces the currently displayed page. Further information about HTML and the WWW can be found in *World Wide Web and HTML* by Douglas MacArthur, pp. 18–26 and *Dr. Dobbs' Journal*, December 1994, and in *The HTML Sourcebook* by Ian Graham, John Wiley Publishers, New York, USA (1995).

In an effort to increase the interactive nature and to enhance the experience of the WWW, recent developments in hyper-media technology have brought about innovations such as Java™ (Sun Microsystems, Inc.) and virtual reality modeling language (VRML, pronounced "ver-mel"). Java technology, for instance, comprises primarily (i) a new programming language, somewhat similar to C and C++, and (ii) a virtual machine. Essentially, programs written in the Java programming language can be compiled into byte code form, and then interpreted at runtime on a Java virtual machine. The Java virtual machine converts the byte codes into instructions that can be executed by the underlying physical machine.

Programs written using Java can be downloaded over the WWW in the form of byte codes for execution on a Java virtual machine at the client 14. Such programs are known as "applets". The use of the Java technology for downloading code over the WWW has two major benefits. Firstly, an applet can be platform independent, if we assume that each client 14 has a copy of the Java virtual machine (the virtual machine at the client's system is typically incorporated either into the operating system, or into the web browser itself). In other words, there is no need for a server 12 to have different versions of the code for downloading to clients 14 according to their respective operating systems and machines. Therefore, only a single version of the relevant code needs to be written and maintained at the server 12, which makes life much simpler for software developers. Secondly, because the applet executes on a virtual machine, rather than a physical machine, security is greatly improved. Thus, when downloading code over the network, there is always a risk that it will include some malicious code (accidentally or otherwise) that may damage data or programs stored at the client. The virtual machine, however, can monitor the operation of the applet to detect and prevent such malicious activity.

It will be noted that the concept of downloading software from a server to a client in the form of byte codes for execution on a virtual machine was also known independently of the Java technology as described, for example, in U.S. Pat. No. 5,347,632.

In order to invoke a Java applet, a web page of HTML text contains an <APPLET> tag, which identifies the URL containing the applet. A browser responds to this tag by retrieving and running the applet. Also defined is a <PARAM> tag, which is contained within a pair of corresponding <APPLET> and </APPLET> tags, and which can be used to specify parameters that are passed to the applet at run-time. (Note that the APPLET and PARAM tags are not formally incorporated into the HTML standard, but are nevertheless recognised by many web browsers). Further information about the Java technology and applets can be found in "*Teach Yourself Java in* 21 *Days*" by Laura Lemay and Charles Perkins, Sams.Net Publishing, Indianapolis, USA (1996).

Out of an effort to heighten the sensory experience of the WWW, three dimensional virtual reality languages have also begun to be developed. One such language is VRML. VRML is a standardized language for describing the animation and three dimensional modeling of geometric objects. VRML allows a three dimensional scene(s) or world(s) to be manipulated in an interactive manner over the Internet and shared by multiple users. Thus, unlike HTML which provides for merely formatting text and images, and for hyperlinks to other web pages, VRML provides for the organization and interaction of three dimensional objects and scenes in a hierarchical fashion within a virtual three dimensional space.

A VRML browser is used to view a three dimensional virtual world constructed using VRML. The VRML browser may be a helper program or plug-in to a web browser that is launched when the web browser detects that a file being downloaded is a VRML document. The VRML browser provides means for allowing the user to move around or navigate the three dimensional virtual world. Typical navigation controls for a VRML browser include walk, spin, look, slide, and point. Typically, the walk control allows the user to move forward and backward within a world, the spin control allows the user to turn in an arcuate fashion within a world, the look control allows the user to zoom in or pan out from a particular area within a world, the slide control allows the user to move sideways in an arcuate fashion within a world, and the point control allows the user to return to his/her initial vantage point within a world.

One problem brought about by the development of WWW technologies such as Java and VRML is that they may require the transfer of relatively large amounts of data from the server 12 to the client 14. When coupled with increased traffic caused by the rapid growth in the number of users on the Internet, the results are lengthier delays which are both variable and unpredictable. During the delay, the user is typically left with some sort of a busy indicator, such as an hour glass pointing device. During the delay, the user is often times not able to perform any other operations. This often leads to user frustration and annoyance. It has been recognized that a key to user satisfaction in an interactive system is maintaining a consistent response time. See, for example, "User Behavior On An Interactive Computer System", S. J. Boies, *IBM Systems Journal,* Vol. 13, No. 1, pp. 2–18 (1974).

This problem is the result of many factors including the current physical and practical limits in transmission speeds (i.e., bandwidth) available on the WWW. Particularly, the connection between a client and his/her access provider or gateway to the Internet is usually not shared, or only lightly shared, by other users and can transmit data relatively fast even though the transmission rate may be relatively slow (e.g., 56 kilobits per second or slower). However, the connection between the access provider, or gateway, and the server where the requested data resides is usually a high traffic link that is shared by many users and that may carry an unpredictable volume of traffic. Moreover, the server where the requested data resides may itself have a variable response time that further delays the retrieval of the data. Therefore, the interactive experience provided by the WWW may be overshadowed by the delays that the user may have to endure when downloading a web page or perform other tasks on the Internet.

In other systems, such as interactive television or proprietary online services (e.g., those services provided by America OnLine, Inc. or Compuserve, Inc.), similar problems may exist where the end user experiences delays while requester input data is processed. For example, in an interactive television system, an end-user may request a customized listing of movies from a database that meets a user-defined set of parameters. Depending upon a variety of factors such as the communication medium utilized, the size and complexity of the database search, and the traffic characteristics of the system, the user may experience a delay from several seconds to more than a minute while waiting for the list to be provided.

In view of the above discussion, improvements are needed in addressing the delays that users experience when using interactive systems.

SUMMARY OF THE INVENTION

In view of the above discussion, it is an object of the present invention to improve the interactive experience of an interactive system such as the World Wide Web.

A further object of the present invention is to maintain user attention while the user is waiting for data to be downloaded over a network.

Yet another object of the present invention is to provide customized information.

Yet another object of the present invention is to reduce the apparent response delay of an interactive system.

These and other objects of the present invention are provided by methods, apparatuses and computer program products which provide information to a user during delays in retrieving program material with an interactive system connected to a network. The information provided to the user is referred to as an insertion as it is inserted into the normal stream of user requested data. This may include making a determination of whether the delay is going to be sufficiently long to provide the user with an insertion. Accordingly, the present invention is able to make use of the delay by providing the user with an insertion which is information provided to the user which may be customized to either the user or the program material requested, or both. Therefore, the frustration and annoyance that the user often experiences while waiting for program material to be retrieved over a network may be lessened by the present invention.

In one embodiment of the present invention, information is provided to a user during delays in retrieving program material with an interactive system connected to a network by detecting a request by the user for program material to be retrieved over the network, and providing an insertion to the user while the program material is being retrieved. The insertion may also be replaced with the program material requested. While the insertion is being presented to the user, the retrieved program material may be cached as it is being received in response to the request.

In accordance with an aspect of the present invention, an expected delay in retrieving the program material over the network may be determined for several uses. For example, if the expected delay in retrieving the program material is sufficient to present the insertion for an adequate period of time, then the insertion may be provided. If, on the other hand, the expected delay is too short to have sufficient time to present the insertion, then the insertion is not provided and the program material is passed on to the requesting application.

The insertion may be retrieved from a repository of insertion information. This can be done randomly or based on user input. The user input can be based on user preferences, program material requested, user profile data, or any other means for defining customized information for the user. The insertion information may be a complete insertion or elements of an insertion that can be used to generate a complete insertion dynamically.

In accordance with another aspect of the present invention, the insertion may include control logic that imparts control over the insertion to the user. This may include providing control logic that replaces the insertion with the requested program material after the program material is retrieved. Alternatively, the control logic may provide the insertion for a predefined period of time. In this case, the period of time that the insertion is presented may be dependent upon how much time it takes to retrieve the requested program material. The insertion may include data of a variety of formats, such as audio data, graphical images, video images, text, or any combination thereof.

In a second embodiment of the present invention, communication between networked computers having a first application resident on a first computer includes the first application transmitting to a proxy application a request for information stored on a second computer, receiving information from the proxy application, and presenting the information received from the proxy application to the user. The proxy application also retrieves the requested information from the second computer, and transmits to the first application an insertion for presentation by the first application. The retrieved information is subsequently sent to the first application.

The proxy application may also determine the amount of time required to retrieve the requested information, and wherein an insertion is selectively transmitted to the first application if the amount of time required to retrieve the requested information is sufficient to transmit the insertion to the first application. The transmission of the retrieved application may, on the other hand, be preceded by waiting a preselected period of time. The preselected period of time may be based upon the insertion transmitted to the first application. The preselected period of time may alternatively be based upon the amount of time required to retrieve the information from the second computer.

As will further be appreciated by those of skill in the art, the present invention as described above may be embodied as a method, apparatus or computer program product.

DETAILED DESCRIPTION OF THE INVENTION

I. Introduction

The present invention now will be described more fully hereafter with reference to the accompanying drawings, in which preferred embodiments of the invention are shown. This invention may, however, be embodied in many different forms and should not be construed as limited to the embodiments set forth herein; rather, these embodiments are provided so that this document will be thorough and complete, and will fully convey the scope of the invention to those skilled in the art. The elements of the drawings are not necessarily to scale, emphasis instead being placed upon clearly illustrating the principles of the present invention. In addition, like numerals refer to like elements throughout the several views.

In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or programmable apparatus create means for implementing the functions specified in the flowchart block or blocks. These computer program instructions may also be stored in a computer-readable memory that can direct a computer or other programmable apparatus to function in a particular manner, such that the instructions stored in computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations steps for performing the specified functions. It will also be understood that each block of the flowchart illustrations, and combinations of blocks in the flowchart illustrations, can be implemented by special purpose hardware-base computer systems which perform the specified functions or steps, or combinations of special purpose hardware and computer instructions.

The present invention takes advantage of retrieval delays in interactive systems by providing informative and/or engaging information in a format suitable for the type of interactive system in which the present invention is operating. For instance, a web page may be provided to a user waiting for a home page of a particular web site to download in the context of the WWW. Likewise, a video/audio clip may be provided to a person waiting for the presentation of a selected movie in the context of on-demand television. Further, the information provided to the user during the delay may be customized for the user to increase the users interest and to make the information more engaging. This is advantageous because it eliminates the frustration and annoyance users often experience when waiting for requested program material to be downloaded in distributed interactive systems. For purposes of the present disclosure, the information provided to the user during the delays is referred to hereinafter as an insert or insertion.

Figure 2:
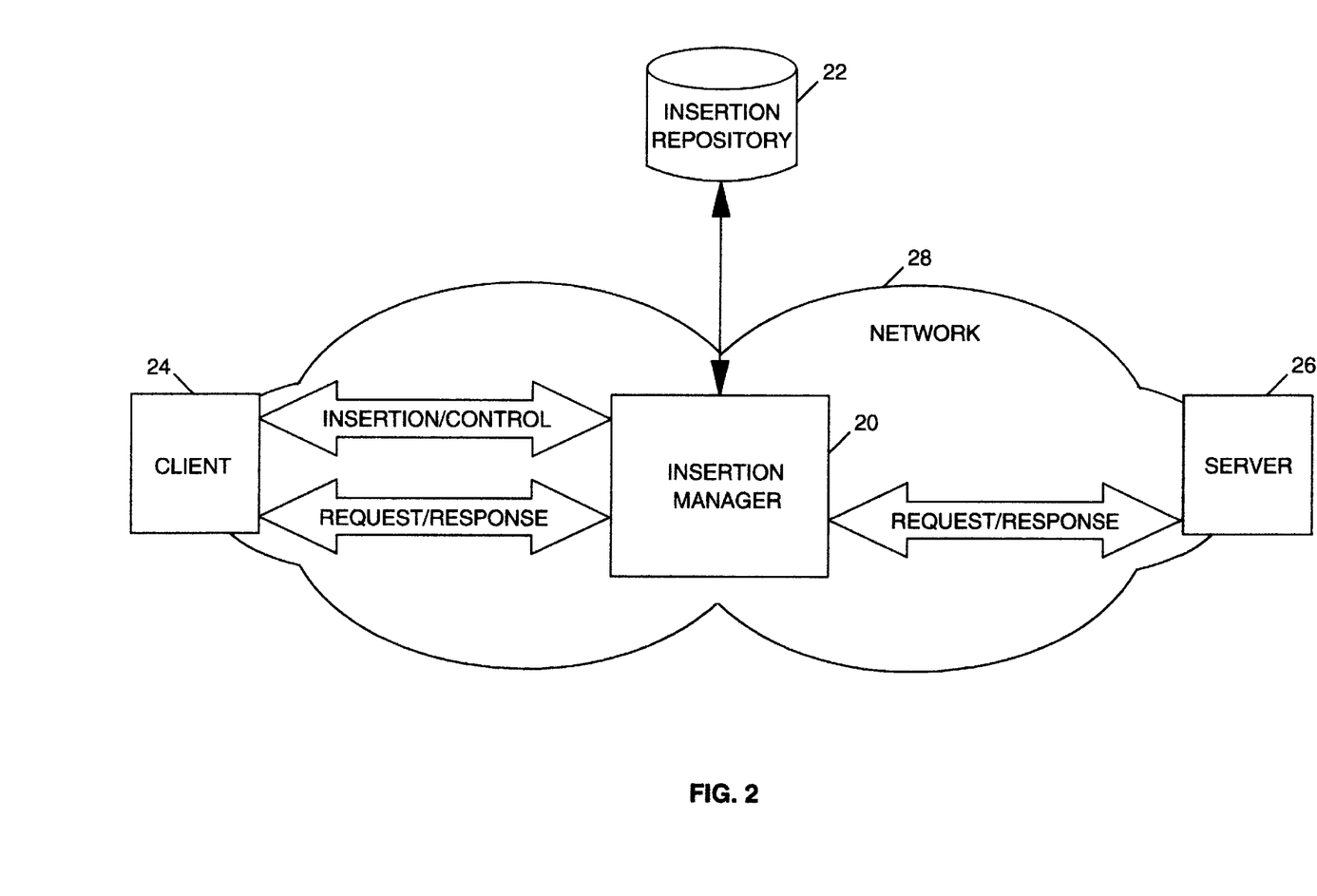
FIG. 2 is a schematic diagram illustrating an interactive system implementing an insertion manager of the present invention.

With reference to FIG. 2, the present invention provides for an insertion manager 20 that implements the present invention in conjunction with an insertion repository 22. In general, the insertion manager 20 detects a request from a client 24 for program material located at a server 26, and then provides the client 24 with an insertion selected from insertion repository 22. The insertion is presented to the client 24 during the delay while the program material is being retrieved from the server 26.

The insertion manager 20 provides the control logic for implementing the present invention and is preferably located logically near the client 24. Logically near, in this sense, refers to a point in the network 28 where the insertion manager 20 and the client 24 can communicate without experiencing the network communication delays that typically occur because of congestion or traffic, that is, the type delays that create an opportunity for presenting an insertion to the user. Therefore, the insertion manager 20 is preferably integrated or located with the client 24, or is preferably located in a computer such as a local server or gateway that has an unshared or lightly loaded path directly to the client 24.

Associated with insertion manager 20 is the insertion repository 22. The insertion repository 22 includes the insertion data or precursor information that can be used to generate the insertion provided to the client 24. Thus, the insertion data may be complete insertions that may be individually selected and sent to the client 24, or alternatively, the insertion data may be elements of an insertion that may be dynamically combined to create an insertion that can be sent to the client 24.

An insertion may be data in virtually any suitable format supported by the interactive system, such as text, graphics, animation, motion video, sound, etc. This also includes the combination of data having different formats into a single insertion for providing a multimedia experience to the client 24. Though not required, the data format(s) which make up an insertion may be different than that of the requested program material. In fact, depending upon the compatibility of the data format(s) of the insertion and the data format(s) of the program material, they may simultaneously be presented to the client 24. For example, if the requested program material is a web page on the WWW and the insertion provided to the client during the retrieval of the web page is an audio message, then the audio message may continue to play to its end without premature termination even though the web page may have been retrieved and is being presented simultaneously to the user, as discussed in greater detail below with reference to FIG. 5.

In accordance with an aspect of the present invention, the insertion may be customized to the user associated with client 24 in order to increase the probability that the insertion will be found engaging and entertaining. Examples of the types of customized information that may be provided as a part of the insertion include but are not limited to news, company or organization bulletins, public service messages, educational material, or commercial material such as advertisements or announcements. Moreover, the information provided by the insertion may be customized to the user, to the type or class of requested program material, or to both the user and the type or class of requested program material.

Before customization of the insertion to the user, the insertion manager 20 is preferably provided with a client profile identifying information such as the client's address, age, gender, income, interests/hobbies, and profession. The information provided in the client profile will then be used by the insertion manager 20 to make specific decisions as to what information is provided to the user in the insertion. Therefore, unlike the systems which customize information at a location logically remote to the client such as at the server, the present invention provides customization at a point logically near the client 24 wherein more information regarding the client may be reasonably ascertained. An example of this is in the context of an Internet service provider (ISP) who may construct a client profile database of all its subscribers. As will be appreciated by one of ordinary skill in the art, essentially any access provider in an interactive system, such as an ISP, will have an opportunity to request the client to input certain data defining the client's preferences which can then be used to construct a client profile.

Alternatively, the insertion may be customized to the type or class of program material requested. In this case, the insertion manager 20 monitors the request and associates the requested program material with a predefined type or class and then selects information for the insertion based upon that type or class. For example, if the client 24 requested the home page for an automobile manufacturer on the WWW, the URL identifying the manufacturer may be associated with an automotive class which could then be used to identify appropriate information in the insertion repository 22 such as a racing schedule of televised races which can then be provided as an insertion to the client 24. It should be noted that when customizing the insertion to the type or class of requested program material, the customized insertion may be provided while the client is waiting for that program material to be downloaded or may be provided subsequent to the requested program material as essentially a queued insertion for the next suitable delay. In the case when an insertion is queued until the client 24 is requesting other program material, it is noted that the insertion may be automatically provided to the user, regardless of the delay. This is an interstitial type insertion.

In addition, the insertion that is customized to the type or class of requested program material may be further customized using a client profile. For instance, in the automobile manufacturer example above, the insertion comprising the televised racing schedule may include local channels and times based upon the geographic location of the client 24.

The insertions provided to the client 24 may also be tied to one another as in a sequence of advertisements. In this case, during an instance of the present invention, a sequence of insertions may have been determined to be appropriate for a particular client 24 and one of the insertions within the sequence provided to the client 24 in that instance by the insertion manager 20. The remaining insertions of that sequence will remain pending until another instance when the insertion manager 20 needs another insertion for the client 24. In order to prevent the client from viewing the same insertion or sequence of insertions more than once, the client profile may include means for identifying insertions that have already been sent to the client 24, including those within a sequence.

The insertions may include a control mechanism that is delivered to the client as a part of the insertion. The control mechanism preferably comprises programming or specifications that can enable the client to interact with and control the insertion. At a minimum, it is expected that the control mechanism will provide for the replacement of the insertion by the requested program material once the program material is received from the distributed server. Other functionality that may be provided by the control mechanism include the dismissal of a particular insertion or the discontinuance of insertions in general. The control mechanism may take any number of forms depending upon the technology supported by the network 28. For instance, in some hypermedia systems the control mechanism may be nothing more than a parameter which requires the client 24 to re-request the requested program material after it has been presented with an insertion. Other hypermedia systems may support actual executable instructions that provide control of the hypermedia system, and more particularly, the insertion.

For example, in the context of the WWW, the control mechanism may be implemented using a META tag, JavaScript, or Java. The META tag is a defined HTML tag that is easily implemented within the HTML code of the insertion. The META tag includes an attribute which instructs a web browser to load another web page in a predefined number of seconds. A more advanced method of implementing the control mechanism is with JavaScript. JavaScript is a program that can be inserted into the insertion by the insertion manager 20 in order to provide more configurability than the META tag, but less than Java. While the capabilities of JavaScript are somewhat inconsistent from web browser to web browser, Java, on the other hand, is generally web browser independent and is capable of providing the client with elaborate control over the insertion and web browser functions, including the user interface. As with the other techniques, a Java APPLET can be inserted into the insertion by the insertion manager 20.

Figure 3:
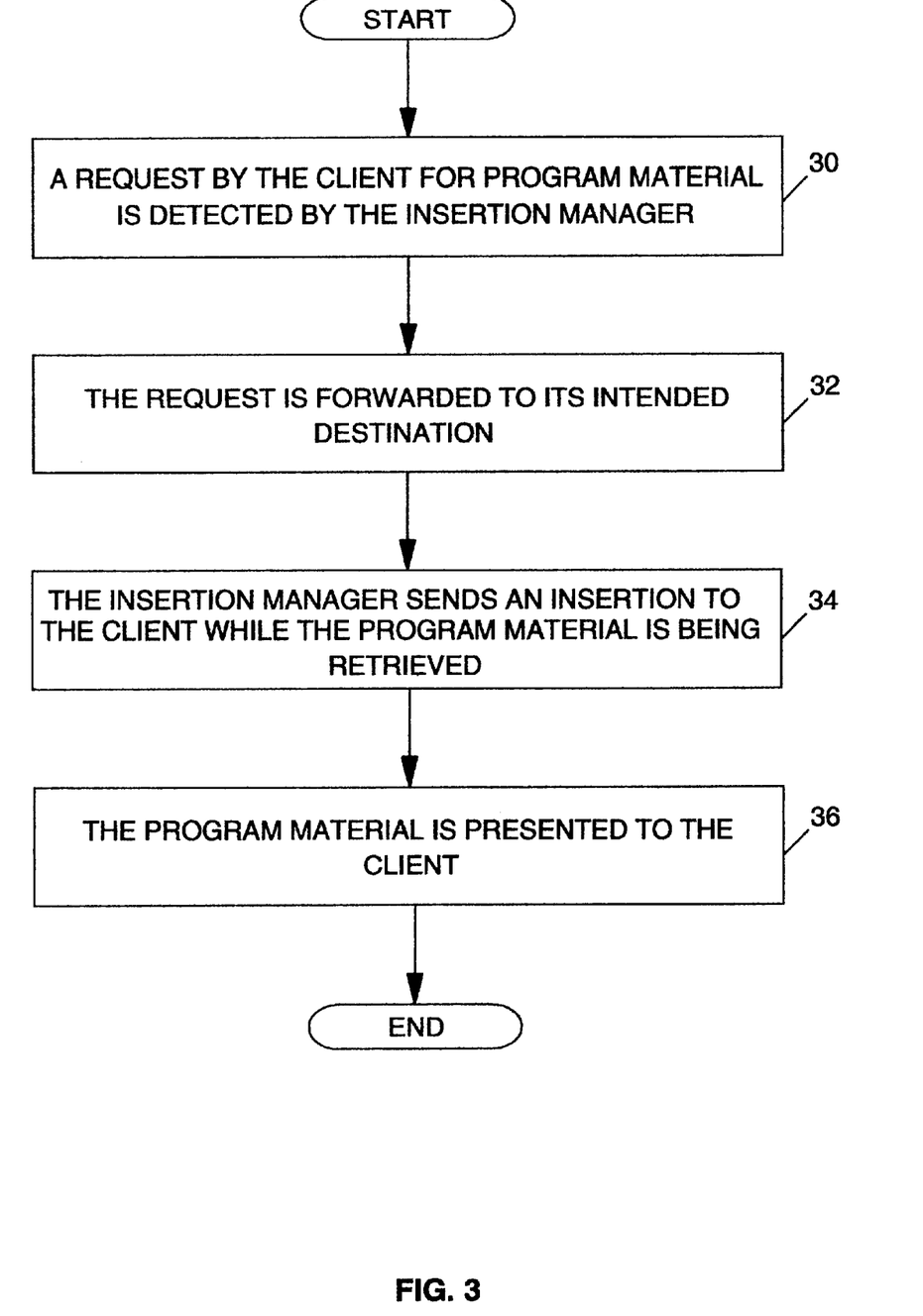
FIG. 3 is a flowchart depicting the operations carried out by the insertion manager of FIG. 2 in accordance with the present invention.

The operation of the present invention as illustrated in FIG. 2 will now be described with reference to FIG. 3. Initially, a request by the client 24 for program material is detected by the insertion manager 20, as indicated by block 30. The request is forwarded to its intended destination which, in this case, is server 26, as indicated by block 32. The insertion manager 20 retrieves an insertion from the insertion repository 22 and sends the insertion to the client 24 while the program material is being retrieved, as indicated by block 34. At block 36, program material is presented to the client 24.

In accordance with an aspect of the present invention, the control logic of the insertion manager 20 may make certain determinations in order to enhance the efficiency with which the insertion manager 20 operates. Specifically, the insertion manager 20 may make a determination of whether the delay in retrieving the program material is sufficiently long to justify retrieving an insertion and sending the insertion to the client 24 for presentation. If the delay is not long enough to provide adequate time for the client to comprehend the information provided by the insertion, then the insertion manager 20 may decide not to provide an insertion, but to merely pass the program material directly to the client 24 as it is received. The determination of whether or not the delay will be sufficiently long may be based upon a variety of factors such as the actual delay that the insertion manager 20 perceives in the network 28, historical knowledge that the insertion manager 20 may have as to delays in the network based upon such factors as time of day, location of the requested program material, etc., or based upon network management information regarding the congestion or traffic within the network 28. If the determination is made by the insertion manager 20 to present the client 24 with an insertion, the insertion manager may also make a determination as to the length of time that the insertion will be presented to the client 24. Again, this predefined period of time may be based upon the expected delay as determined above. Alternatively, the insertion manager 20 may buffer the data comprising the program material as it is being received from the server 26 so that it may be delivered to the client 24 in an optimal fashion. By determining an effective transmission rate and knowing the amount of data comprising the requested program material, the insertion manager may make a determination as to how long it will take to receive all or nearly all the data comprising the program material. Based upon this estimation, the insertion manager 20 may then make a determination of how long to provide the insertion to the user before beginning to forward the buffered data to the client 24 in order that the last byte of data is delivered at approximately the same time as it would have been if the data had been downloaded directly to the client 24 rather than being buffered by the insertion manager 20.

Figure 4A:
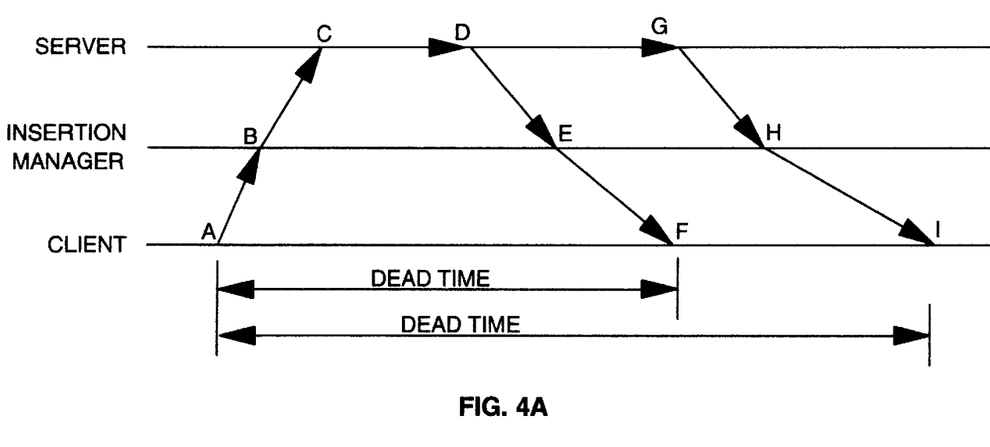
FIGS. 4A–4B are timing diagrams illustrating a comparison of the download delays between an interactive system without the present invention (FIG. 4A) and an interactive system with the present invention (FIG. 4B)
Figure 4B:
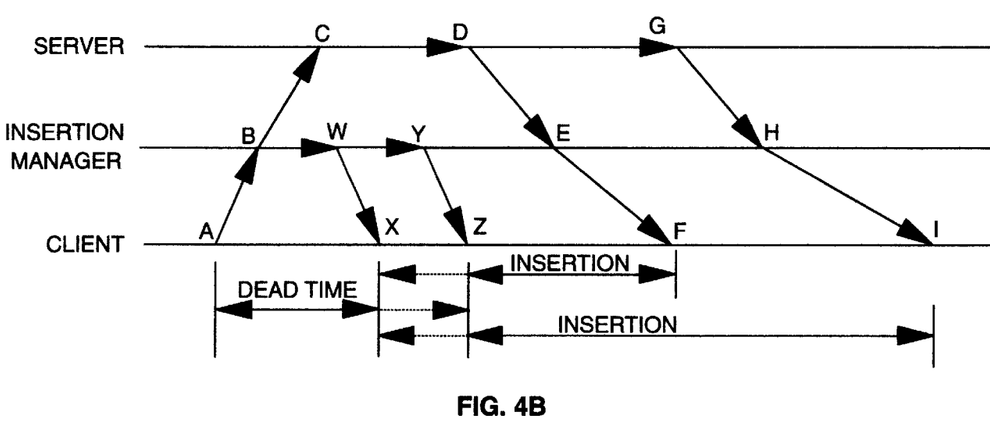

Accordingly, the present invention is able to provide an insertion of customized information to a client during the retrieval of requested program materials which, without the present invention, will be perceived as dead time to the client 24. This is graphically illustrated in FIGS. 4A and 4B which show the timing relationship between a system that does not implement the present invention (FIG. 4A) and a system which does implement the present invention (FIG. 4B). Referring to FIG. 4A which does not implement the present invention, a client initiates a request at time A which is passed through the insertion mechanism at time B to the server 26 within the network 28 at time C. After a time delay, the server 26 begins to transmit the requested program material to the client 24 at time D. The beginning of the program material that was sent at time D ultimately arrives at the client 24 at time F. The server 26 continues to transmit the program material through time G and the requesting client continues to receive the program material until time I. As evident from FIG. 4A, the client experiences a delay from time A through at least time F, and possibly through time I. During the interval from time F to time I, the user may be presented with results depending upon the specific technology and specific content for that particular instance.

With the present invention, as illustrated in FIG. 4B, the insertion manager at time B not only passes the request on to the server 26 but begins the process of the present invention which may include making certain determinations as to whether or not the delay may be sufficient to provide an insertion. This may include the initiation of a timer at time B to determine if insertion manager 20 receives a response from the server 26 within a predefined period of time. If the insertion manager 20 does not receive a response by time W, then the insertion manager 20 may respond by sending an insertion to the client 24 which may take from time W to time Y. The insertion is received at the client 24 from time X to time Z. Therefore, the client is presented with the insertion from at least time Z through time F, and perhaps from time X through time I, again depending upon the specific content and technology.

Figure 5:
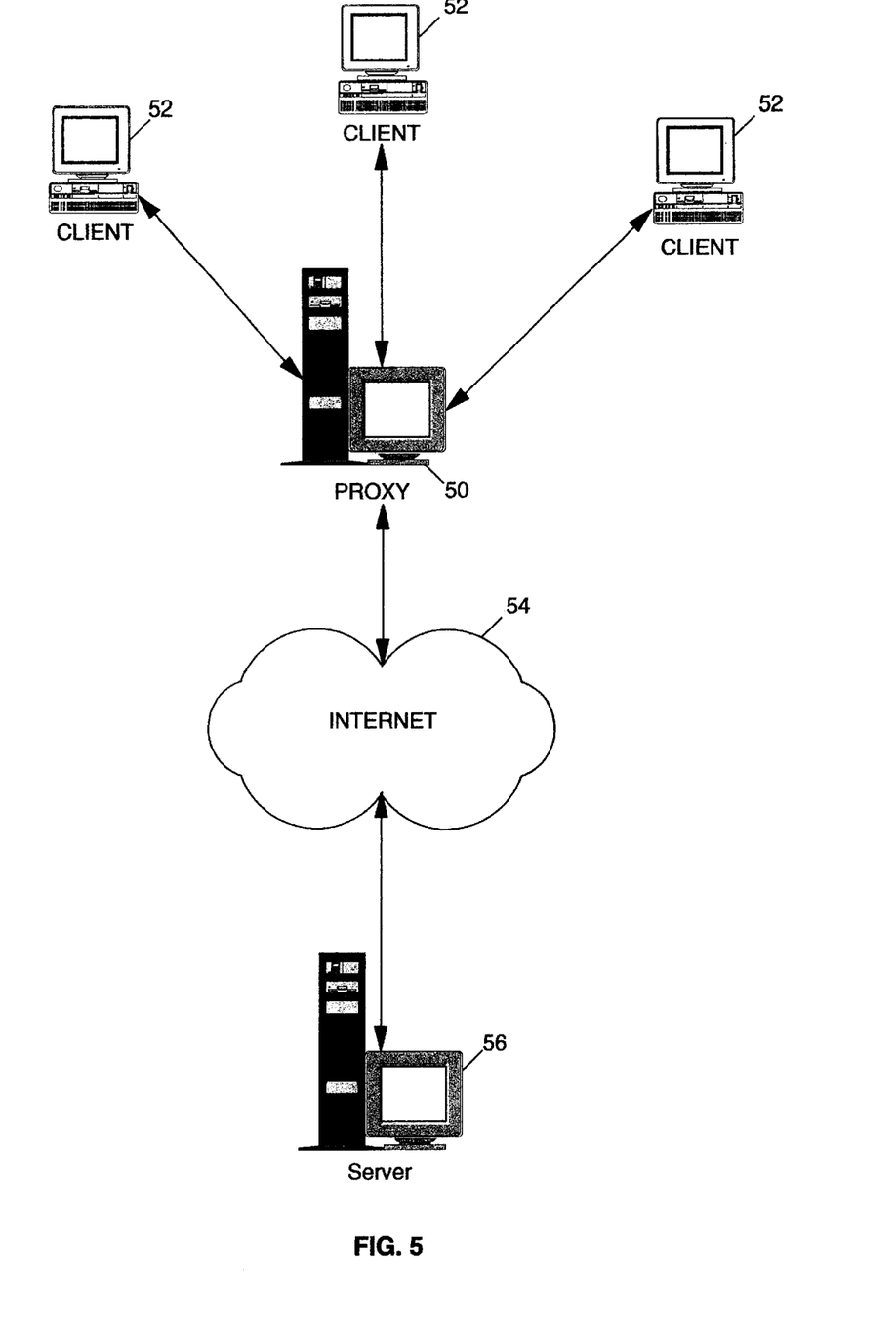
FIG. 5 is a schematic diagram illustrating an example of an interactive system such as the Internet or an intranet wherein an insertion manager in accordance with the present invention is implemented at a proxy.

An embodiment of the present invention will now be described with reference to FIGS. 5–7 in the context of the Internet (i.e., the WWW). The insertion manager 20 in this embodiment is implemented at a proxy 50 which serves as an access provider to the Internet (also referred to as an ISP) for one or more clients 52, as illustrated in FIG. 5. The proxy 50 is interconnected to the Internet 54 which includes a connection to the server 56. In this paradigm, a client 52 includes a web browser application which allows a user to request a web page located at the server 56. A request for a web page will seamlessly passes through the proxy 50 to the Internet 54 where it is directed to the server 56 according to the hypertext transfer protocol (HTTP). In this configuration, the connection of each respective client 52 to the proxy 50 is typically a point-to-point connection that is not shared, or only minimally shared, with other clients 52. Thus, the connection between the clients 52 and the proxy 50 does not generally provide a traffic bottleneck or cause significant delay in the retrieval of the requested web page. More often than not, it is the connection between proxy 50 and the Internet 54, which is shared by each of the clients 52, and the Internet 54 itself which often experience a large amount of traffic causing retrieval delays. In addition, the connection between the Internet 54 and the server 56 carries all the transmissions to and from the server 56 which at times may be backed up with request and responses. It is also noted that other sources of delays in the paradigm of the WWW may include processing delays at the server 56, packet storms which may occur at each node within the Internet 54, or known periods of high usage.

Figure 6:
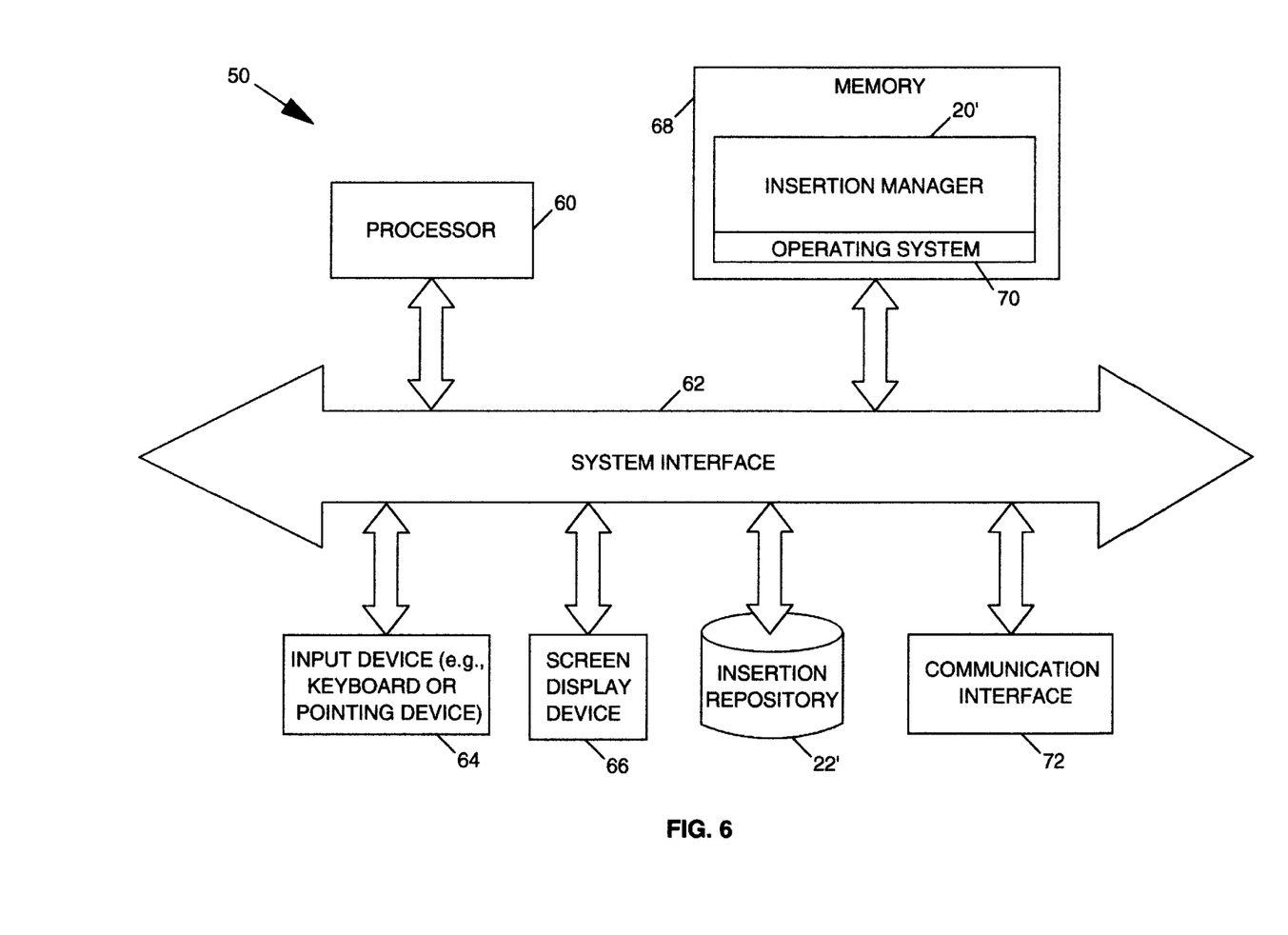
FIG. 6 is a block diagram illustrating an insertion manager in accordance with the present invention situated within a computer-readable medium, for example, in the memory of the proxy of FIG. 5.
Figure 7:
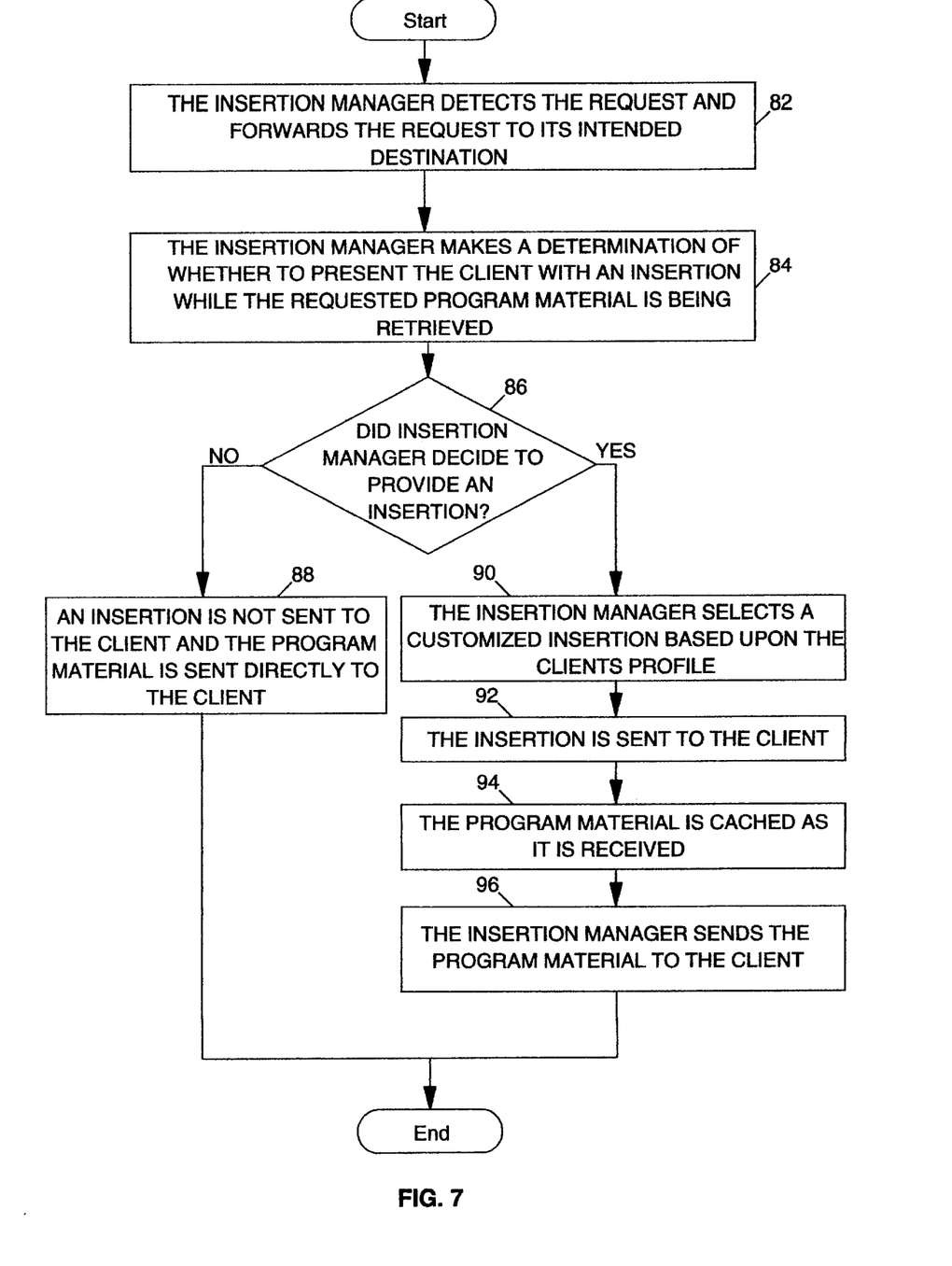
FIG. 7 is a flowchart depicting the operations carried out by the insertion manager of FIG. 6 in accordance with a the present invention.

With reference to FIG. 6, the architecture of proxy 50 is illustrated. Particularly, the proxy 50 includes an insertion manager 20' in accordance with the present invention. The proxy 50 further includes a processor 60 that communicates with the other elements within the proxy 50 via a system interface 62. An input device 64, for example, a keyboard or pointing device, is used to input data and a screen display device 66, for example, a monitor, is used to output data. A memory 68 within the proxy 50 includes a conventional operating system 70 which communicates with the insertion mechanism 20' and enables the execution of the insertion mechanism 20' via the processor 60. An external communication link 72 is provided to interface the proxy 50 with each of the clients 52 and the Internet 54. Lastly, an insertion repository 22' is provided as a persistent memory device for storing insertion data as described hereinbefore. It should be known at this point that the insertion manager 20' could alternatively be integrated into any one of the clients 54 or operation in connection with that particular client. In addition, the insertion manager 20' could be implemented at a fire wall or gateway of an intranet connection to the Internet 54.

The operation of the present invention in accordance with the embodiment illustrated in FIG. 5 is described hereinafter with reference to FIG. 7. Initially, a client 52 issues a request for information located on server 56. The information in this embodiment is most likely an HTML document or other hypermedia file(s) comprising, but not limited to, a web page, a virtual reality world, a radio/audio message, an image, an animation, or text. The request of the client 52 is received by the proxy 50 where it is detected and forwarded to its intended destination at server 56 via the Internet 54, as indicated by block 82. At block 84, the insertion manager makes one or more determinations of whether to present the client 52 with an insertion. For instance, the insertion manager 20' may initially determine an expected delay which may be based upon actual delay, historical information, or information provided by a system management server.

With regard to an actual delay, the insertion manager 20' may initiate a timer upon receiving the request in order to determine if a response is received from the server 26 within a predetermined period of time. If it is, then the expectation may be that the delay will not be long enough to warrant the provision of an insertion to the client 52, and therefore, the requested data will be passed directly to the client 52 without the provision of an insertion. Alternatively, if the response was not received within a predetermined period of time, then the insertion manager 20' may determine that the delay will be sufficiently long to provide an insertion, and thus, proceed to send an insertion to the client 52.

With regard to historical information, the insertion manager 20' may have available to it information identifying certain times of the day or days of the week in which the expected delay over the Internet 54 is predictable. With regard to system management information, the insertion manager 20' may have access to a system management server which may be able to provide system congestion/traffic information which can be utilized by the insertion manager 20' to determine an expected delay. Based upon the determined expected delay, the insertion manager 20' then determines whether or not to send an insertion to the client 52.

At block 86, it is determined whether the insertion manager 20' decides whether or not to provide the client 52 with an insertion. If the insertion manager 20' decided not to provide the client 52 with an insertion, the program material is sent directly to the client 52 upon receipt, as indicated by block 88, and the present instance of the process ends. Alternatively, if the insertion manager 20' decides to provide the client 52 with an insertion, the insertion manager 20' then selects a customized insertion based upon the client profile for the requesting client, as indicated by block 90. As previously discussed, the insertion may be customized based upon other factors other than a client profile, such as the type or class of program material requested, or a combination of both the client profile and the type/class of program material requested. Further, the customization of the insertion may include reviewing the hardware configuration of the client 52 as can be provided in a user profile so that the data format of the insertion is compatible with the client 52.

The customized insertion is then retrieved from the insertion repository 22' and sent to the client 52, as indicated by block 92. It is noted that more than one insertion may be provided to the client 52 while the program material is being retrieved. As the program material begins to arrive at the proxy 50, the proxy 50 caches the program material so that it can be delivered to the requesting client in an optimal fashion, as discussed above, as indicated by block 94. It is noted that the program material does not have to be cached at the proxy 50, but may alternatively be passed on directly to the client 52. Next, at block 96, at the appropriate time for optimal delivery, the insertion manager 20' begins sending the program material to client 52, replacing the insertion.

Depending upon the compatibility of the data format of the insertion and the program material, the insertion may continue to be presented to the user simultaneously with the program material. For instance, if the insertion is an audio file (e.g., a .wav file) and the program material is a static web page, then the audio file may continue to be played at the client 52 while the program material is being presented to the user at client 52.

Though the embodiment described above is directed to the WWW, the present invention can be applied to many other types of distributed interactive networks, as previously mentioned. For example, the present invention can be applied to digital television wherein the network is a distributed cable, fiber, or fiber/coax hybrid network that supports data formatted as motion picture experts group (MPEG) data stream, the national television standards committee (NTSC) format, or the phase alternating line (PAL) format, or any other suitable television format.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for communicating between networked computers having a first application resident on a first computer, the method comprising:
   wherein the first application carries out the following steps:
   transmitting to a proxy application over a network, requests for information stored on a second computer;
   receiving information from the proxy application over the network;
   displaying information received from the proxy application to a user irrespective of whether the information is the response to the request for information from the second computer; and
   wherein the proxy application carries out the following steps:
   requesting the information requested by the first computer from the second computer;
   determining the amount of time required to retrieve the requested information from the second computer;
   transmitting to the first application over the network an insertion for display by the first application if the amount of time required to retrieve the requested information from the second computer is sufficient to transmit the insertion to the first computer, wherein the insertion is transmitted in response to the receipt of the request for information from the second computer;
   receiving the requested information from the second computer; and
   transmitting to the first application over the network, the received requested information after transmission of the insertion to the first application if an insertion is transmitted to the first application.

2. The method of claim 1, wherein the step of transmitting to the first application the retrieved information is preceded by the step of waiting a preselected period of time.

3. The method of claim 2, wherein the preselected period of time is selected based upon the insertion transmitted to the first application.

4. The method of claim 2, wherein the preselected period of time is selected based upon the amount of time required to retrieve the information from the second computer.

5. The method of claim 1, wherein said step of transmitting an insertion to the first application includes transmitting information that is customized based on user input.

6. The method of claim 1, where said step of transmitting to the first application an insertion is preceded by the step of retrieving the insertion from a repository of predefined insertion information.

7. The method of claim 1, where said step of transmitting to the first application an insertion is preceded by the step of retrieving the insertion from a repository of predefined insertion information based upon user input.

8. The method of claim 1, where said step of transmitting to the first application an insertion is preceded by the step of dynamically generating the insertion.

9. The method of claim 1, wherein said step of determining the amount of time required to retrieve the requested information includes the step of timing the delay from when the request is intercepted to when a response to the request is received.

10. The method of claim 1, wherein said step of determining the amount of time required to retrieve the requested information includes utilizing historical usage information.

11. The method of claim 1, wherein said step of determining the amount of time required to retrieve the requested information includes utilizing network management information.

12. The method of claim 1, wherein the insertion includes control logic that imparts control over the insertion to the user.

13. The method of claim 12, wherein the control logic includes a mechanism that replaces the insertion with the requested program material.

14. A method of providing information to an application over a network, the method comprising:
    intercepting requests for information transmitted over the network from the application;
    determining the amount of time required to retrieve the requested information;
    providing an insertion over the network to the application in response to the intercepted request for information if said step of determining the amount of time determines that the time required to retrieve the requested information is sufficient to provide the insertion to the application;
    retrieving the requested information; and
    providing the retrieved information to the application over the network after the insertion is provided to the application if an insertion is provided to the application.

15. The method of claim 14, wherein the step of providing the retrieved information to the application is preceded by the step of waiting a preselected period of time.

16. The method of claim 14, wherein said step of determining the amount of time required to retrieve the requested information includes the step of timing the delay from when the request is intercepted and when a response to the request is received.

17. The method of claim 14, wherein said step of determining the amount of time required to retrieve the requested information includes utilizing historical usage information.

18. The method of claim 14, wherein said step of determining the amount of time required to retrieve the requested information includes utilizing network management information.

19. The method of claim 14, further including the step of providing a second insertion to the application in response to the request for information.

20. The method of claim 14, wherein said step of providing the insertion includes transmitting insertion information that is customized to a user.

21. The method of claim 14, where said step of providing the insertion includes transmitting insertion information that is customized to the information requested.

22. The method of claim 14, wherein the insertion includes control logic that imparts control over the insertion to the user.

23. The method of claim 22, wherein the control logic includes a mechanism that replaces the insertion with the requested program material.

24. An apparatus for providing-information to an application over a network, comprising:
   means for intercepting requests for information transmitted over the network from the application;
   means for determining the amount of time required to retrieve the requested information;
   means for providing an insertion over the network to the application in response to the intercepted request for information if the means for determining the amount of time determines that the time required to retrieve the requested information is sufficient to provide the insertion to the application;
   means for retrieving the requested information; and
   means for providing the retrieved information to the application over the network after the insertion is provided to the application if an insertion is provided to the application.

25. The apparatus of claim 24, wherein the means for providing the insertion includes means for providing insertion information that is customized to a user.

26. The apparatus of claim 24, wherein said means for determining the amount of time required to retrieve the requested information includes means for timing the delay from when the request is intercepted to when a response to the request is received.

27. The apparatus of claim 24, wherein said means for determining the amount of time required to retrieve the requested information includes utilizing historical usage information.

28. The apparatus of claim 24, wherein said means for determining the amount of time required to retrieve the requested information includes utilizing network management information.

29. The apparatus of claim 24, wherein the insertion includes control logic that imparts control over the insertion to the user.

30. The apparatus of claim 29, wherein the control logic includes a mechanism that replaces the insertion with the requested program material.

31. A computer program product for providing information to an application over a network, the computer program product comprising:
   a computer-readable storage medium having computer-readable program code means embodied in said medium, said computer-readable program code means comprising:
   computer readable program code means for intercepting requests for information transmitted over the network from the application;
   computer readable program code means for determining the amount of time required to retrieve the requested information;
   computer readable program code means for providing an insertion over the network to the application in response to the intercepted request for information if the computer readable program code means for determining the amount of time determines that the time required to retrieve the requested information is sufficient to provide the insertion to the application;
   computer readable program code means for retrieving the requested information; and
   computer readable program code means for providing the retrieved information to the application over the network after the insertion is provided to the application if an insertion is provided to the application.

32. The computer program product of claim 31, wherein the computer readable program code means for providing the insertion includes computer readable program code means for providing insertion information that is customized to a user.

33. The computer program product of claim 31, wherein the computer readable program code means for providing the insertion includes computer readable program code means for providing insertion information that is customized to the information requested.

34. The computer program product of claim 31, wherein computer readable program code means for determining the amount of time required to retrieve the requested information includes computer readable program code means for timing the delay from when the request is intercepted to when a response to the request is received.

35. The computer program product of claim 31, wherein the computer readable program code means for determining the amount of time required to retrieve the requested information includes utilizing historical usage information.

36. The computer program product of claim 31, wherein the computer readable program code means for determining the amount of time required to retrieve the requested information includes utilizing network management information.

37. The computer program product of claim 31, wherein the insertion includes control logic that imparts control over the insertion to the user.

38. The computer program product of claim 37, wherein the control logic includes a mechanism that replaces the insertion with the requested program material.

* * * * *